United States Patent [19]
Baker

[11] 4,160,276
[45] Jul. 3, 1979

[54] APERTURE CORRECTION CIRCUIT

[75] Inventor: Daniel G. Baker, Beaverton, Oreg.

[73] Assignee: Tektronix, Inc., Beaverton, Oreg.

[21] Appl. No.: 846,742

[22] Filed: Oct. 31, 1977

[51] Int. Cl.$^2$ ............................................. H04N 5/14
[52] U.S. Cl. ..................................... 358/162; 333/216
[58] Field of Search ................... 333/32, 80 R, 80 T; 358/162; 330/57

[56] References Cited
U.S. PATENT DOCUMENTS

| | | | |
|---|---|---|---|
| 3,168,656 | 2/1965 | Kobbe | 333/32 X |
| 3,384,844 | 5/1968 | Meachem | 333/80 T |

Primary Examiner—Robert L. Richardson
Attorney, Agent, or Firm—William D. Haffner

[57] ABSTRACT

The present invention relates generally to electrical signal transmission lines which are terminated in a manner enabling efficient use of signal energy transmitted through such lines while preventing signal reflections in such lines, and in particular is directed to a termination circuit for a lossy delay line which includes a pair of emitter coupled transistors having positive feedback to develop a negative impedance to terminate the lossy delay line to compensate for the loss in the lossy delay line.

6 Claims, 1 Drawing Figure

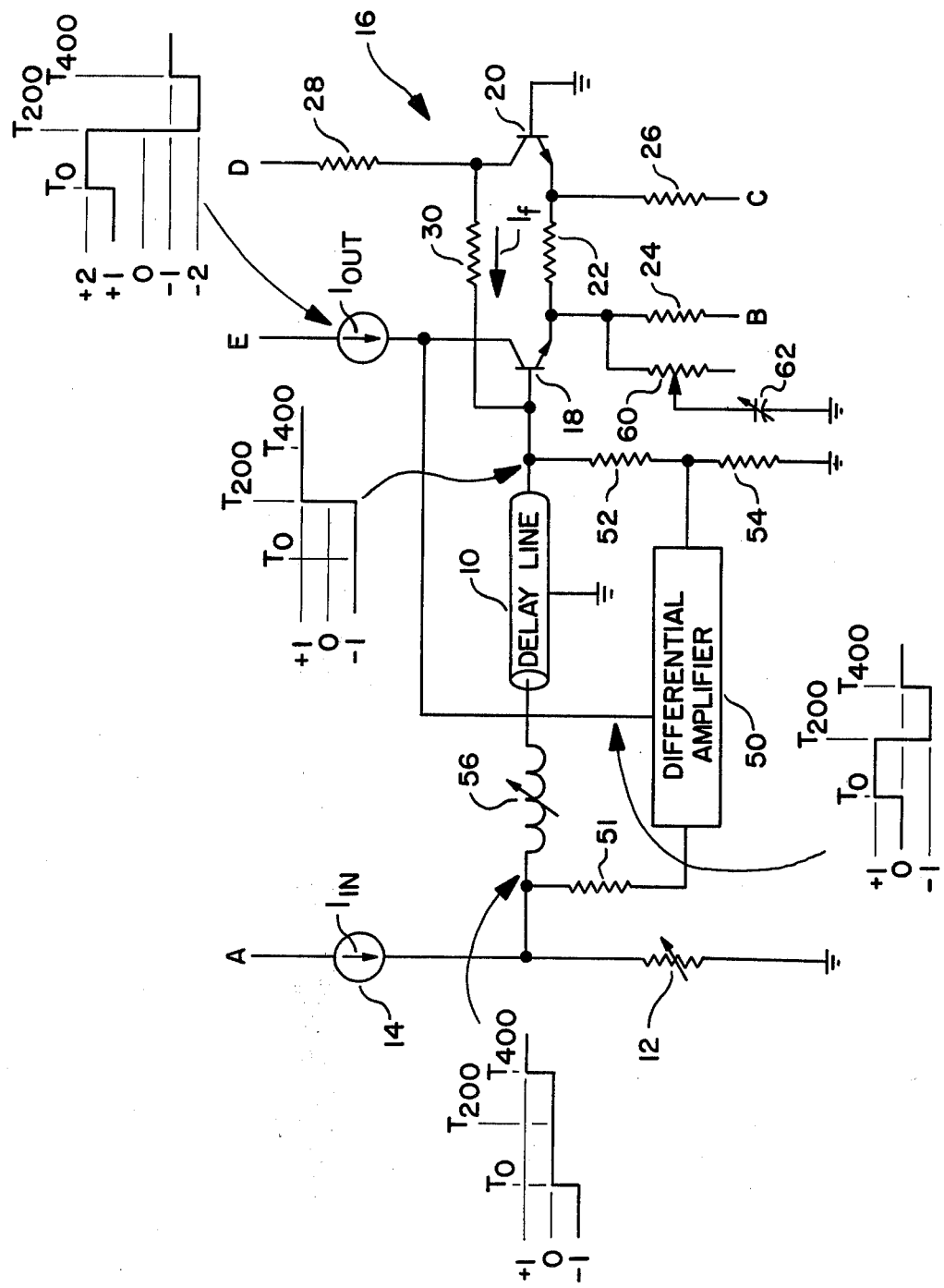

APERTURE CORRECTION CIRCUIT

BACKGROUND OF THE INVENTION

In U.S. Pat. No. 3,168,656 to Kobbe there is described a delay line of substantially uniform characteristic impedance having its input end terminated in an impedance substantially equal to the characteristic impedance of the line. At the output end of the line a resistor and the emitter junction of an amplifying transistor are connected in series to form the terminating impedance which is connected to ground at the base of the transistor. The sum of the resistances of the resistor and the emitter junction is made substantially equal to the characteristic impedance of the line. The transistor is connected as a common base amplifier so that current flowing through the emitter junction provides a voltage output at the collector of the transistor. By employing this current-actuated amplifying transistor as part of the output end termination impedance the gain of the transistor compensates for any loss of signal energy due to termination of the output line in its characteristic impedance.

While the above discussed circuit terminates the line in its characteristic impedance to minimize spurious signals due to reflection of signal energy in the delay line, and compensates for any loss of signal energy due to termination of the output in its characteristic impedance, the circuit cannot be used where the terminating impedance must be high and the reflection coefficient must be unity. These requirements occur in applications implemented with a single delay line providing special transient effects of a single terminated delay line such as correcting distortion of a television signal due to the size of the electron beam by boosting the high frequency gain in a phase linear manner. This application requires a symmetrical preshoot and aftershoot over the range of the correction which is not possible utilizing the Kobbe teachings.

In "Wave Generation And Shaping" by Leonard Strauss (pages 464-516) there is described how positive-current feedback can be used with an ideal current amplifier to produce a negative input impedance; if current amplification within the active region is positive or greater than unity, the input impedance becomes negative. Unfortunately, such characteristics have only been utilized to provide, for example, astable multivibrators, switching circuits, etc. Such teachings, coupled with Kobbe, if carried further, could be used to make a circuit for terminating electrical signal transmission lines, for providing a variable aperture correction circuit which provides the special transient effects to correct the distorted television signal uniformly over the dynamic range of the variable control, etc.

SUMMARY OF THE INVENTION

Accordingly, the present invention overcomes the disadvantages of the prior art in that a circuit for terminating a lossy delay line, which includes a pair of emitter coupled transistors having positive feedback current, is provided. Additionally, by differentially comparing the ends of the lossy delay line to control the positive feedback a aperture corrector circuit for correcting a distorted television signal can be realized.

It is therefore an object of the present invention to provide a negative impedance delay line termination which overcomes the disadvantages of the prior art.

It is another object of the present invention to provide a high negative impedance delay line termination to precisely compensate for losses in the line.

It is yet another object of the present invention to provide an aperture corrector circuit, requiring an unterminated lossless delay line, with a realizable lossy delay line.

It is still yet another object of the present invention to provide a variable aperture correction circuit with a single delay line providing the special transient effects of an ideal singularly terminated delay line.

The subject matter of the present invention is particularly pointed out and distinctly claimed in the concluding portion of this specification. The invention, however, both as to organization and method of operation together with further advantages and objects thereof, may best be understood by reference to the following description taken in connection with the accompanying drawing.

BRIEF DESCRIPTION OF THE DRAWING

The single FIGURE is a circuit for terminating a lossy delay line in a negative impedance and simultaneously providing an aperture correction circuit according to the present invention.

DESCRIPTION OF INVENTION

Referring now to FIG. 1 of the drawings, the circuit of the FIGURE includes a delay line 10 which may be a pair of wires wound on a supporting core, a coaxial cable, or artificial transmission line made up of a plurality of substantially identical sections containing inductance and capacitance which are properly adjusted to provide a specified and substantially uniform characteristic impedance. A first termination resistor 12 which can be variable as indicated has one terminal connected to the input terminal of delay line 10. Termination resistor 12 may actually be a complex series-parallel impedance network containing inductance and capacitance as well as resistance in order to match the complex characteristic impedance of the line. The same terminal of termination resistor 12 connected to the input terminal of delay line 10 is also connected to a source 14 which, for the description, provides the input signal, a current $I_{in}$, to the delay line 10. The other terminals of terminating resistor 12 and source 14 are connected to ground and a source of reference potential A, respectively. The return portion of the delay line 10 is also grounded. As termination resistor 12 and source 14 are basic circuits, which are well known, no further discussion is believed necessary.

In accordance with the invention, a second termination is connected to the output terminal of delay line 10 to compensate for losses in delay line 10. This termination is the circuit generally indicated at 16 and is seen to comprise an emitter-coupled pair of transistors 18 and 20 whose emitters are connected together via a first gain determining resistor 22. Each emitter of the transistor pair is also coupled to suitable sources of potential B and C through emitter resistors 24 and 26, respectively. The collector of transistor 20 is coupled to another source of potential D as well as to the output terminal of delay line 10 via load resistor 28 and feedback resistor 30, respectively. The input of the second termination is the base of transistor 18 also connected to the output terminal of delay line 10. The circuit is completed with the base of transistor 20 grounded thereby enabling the termination circuit to be considered as an emitter-coupled transistor pair forming a phase inverter feedback amplifier i.e., signal applied to one base whereas the second base is not excited. The output signal of the circuit is a current $I_{out}$ available in the collector of transistor 18 also connected to a source of potential E.

Basically, transistor 20 provides an in-phase current $I_f$ through feedback resistor 30 to the input (base of transistor 18) as well as temperature compensating transistor 18. This in-phase current causes the circuit to exhibit a negative impedance for terminating delay line 10 in order to compensate for losses due to delay line 10 by supplying energy otherwise lost in the line. This in-phase current $I_f$ may have a magnitude necessary to extend over a range of negative termination impedances, and the magnitude chanted to accomodate specific delay line losses within the range.

In addition, by adding a differential device to the circuit, an aperture correction circuit for correcting a television signal can be provided; aperture distortion is, of course, a distortion of a television signal due to the size of the electron scanning beam and can be reduced by boosting the high frequency gain in a phase linear manner of the television signal. In this application the source 14 would represent a means of providing the television signal to be corrected and the current $I_{out}$ is the corrected signal. In addition to the already mentioned components of the embodiment, a series circuit comprising resistors 52 and 54 is disposed between the output lead of delay line 10 and ground and a differential amplifier 50 such as disclosed in U.S. Pat. No. 3,689,752 is disposed so as to compare the signal level at the input lead of delay line 10 via a resistor 51 to the signal level at the output lead of delay line 10. The comparator is coupled on the one side between the resistors 52 and 54, to attenuate the signal at the input to the comparator 50 on the output end of the delay line. The output of comparator 50 is coupled to the collector of transistor 18 to enable a difference current to be summed with $I_{out}$. If desired, a variable control means may be connected to differential amplifier 50 to variably control the comparison of the ends of delay 10 to thereby make the corrector variable. Such means might be, for example, variable DC bias means to control the levels at which comparison occurs across delay line. Also, a delay line S correction variable inductor 56 may be included if necessary. It should also be mentioned that a peaking network comprising a series connected variable resistor 60 and variable capacitor 62 may be connected between the emitter of the transistor 18 and ground to also control the AC gain of the transistor amplifier.

Basically, circuit operation to provide a correction whereby symmetrical preshoot and aftershoot is obtained over the range of the correction is as follows. Assume for the explanation that delay line 10 has a delay of 200 nanoseconds and that a positive going step-wave of 1 unit peak-to-peak and starting at −1 and stepping to zero at time $T_0$ is applied to the input of the delay line, 400 nanoseconds later, at time $T_{400}$, the step-wave is reflected back to the input of the delay line and adds thereto causing the wave to step to a +1 level. As indicated in the drawing, gamma or the reflection coefficient is such that the reflected step-wave is identical to the incident step wave. This is possible because according to the invention, the negative impedance causes the peak-to-peak amplitude of the step-wave at the output terminal of the delay line to be somewhat larger than the normal 2 unit peak-to-peak amplitude and as such makes up for losses in the line, an object of the invention.

Since the step-wave at the output of delay line 10 has been increased to overcome losses, resistors 52 and 54 form a corrective attenuator to compensate for line losses during the second propogation of the signal in the delay line. This insures that differential amplifier 50, which subtracts the step-wave at the output terminal of delay line from the step-wave at the input of the delay line is a more perfect subtractor. The current output of differential amplifier 50 is therefore as shown and when added to the current in the collector of transistor provides the symmetrical preshoot and aftershoot as indicated. It should be mentioned that while the various waveforms are drawn as having perfect response, there is, of course, rounding on all corners.

While it should not be considered to be limiting of the invention, it has been found that the following circuit values have proved effective in terminating a specific 200 nanosecond delay line for maintaining a reflection coefficient equal to 1.

Impedance 12 — ≃540 Ω
Resistor 22 — 1.4K Ω
Resistor 24 — 10K Ω
Resistor 26 — 3.3K Ω
Resistor 28 — 3.83K Ω
Resistor 30 — 2.15 K Ω
Source A — +15 volts
Source B — −15 volts
Source C — −15 volts
Source D — +15 volts
Source E — +15 volts
Transistors — 2N 3904
Resistor 51 — 1 K Ω
Resistor 60 (if used) — 10 K Ω
Capacitor 62 (if used) — 5–65 pfd
Inductor 56 — 2–10μh
Delay Line 10 — Spiradel MD 200; Z500

While there has been shown and described the best mode of the invention as contemplated by the inventor, it will be apparent to those skilled in the art that many changes and modifications may be made without departing from the invention in its broader aspects. Therefore, the appended claims are intended to cover all such changes and modifications that fall within the true spirit and scope of the invention.

The invention is claimed in accordance with the following:

1. A variable aperture corrector circuit for reducing aperture distortion of a television signal, comprising:
   a delay line having a first end responsive to the television signal and a second end;
   a differential amplifier operatively disposed between both said first end and said second end for differentially comparing the signal at said first end with the signal at said second end of said line to provide a correction output signal, said differential amplifier including means for variably controlling said comparison; and
   termination means coupled to said second end of said delay line for providing a negative terminating impedance to compensate for losses in said delay line, said termination means including an emitter-coupled transistor pair forming a phase inverting feedback amplifier for providing said negative terminating impedance to compensate said losses in said delay line.

2. A variable aperture corrector circuit for correcting aperture distortion in a television video signal, comprising:
   a delay line having an input terminal responsive to the television signal and an output terminal for supplying a delayed television video signal;
   means operatively disposed between said input terminal and said output terminal for comparing the signal levels at said terminals to provide a correction output signal; and
   termination means coupled to said output terminal of said delay line for providing a negative terminating impedance to compensate for losses in said delay line.

3. A variable aperture corrector circuit for correcting aperture distortion in a television video signal according to claim 2 wherein said means for comparing comprises a differential amplifier.

4. A variable aperture corrector circuit for correcting aperture distortion in a television video signal according to claim 3 wherein said differential amplifier includes means for variably controlling the level at which said comparison is made.

5. A variable aperture corrector circuit according to claim wherein said termination means comprises a phase inverting feedback amplifier.

6. A variable aperture corrector circuit according to claim 5 wherein said phase inverting feedback amplifier comprises an emitter-coupled transistor pair.

* * * * *

UNITED STATES PATENT AND TRADEMARK OFFICE
CERTIFICATE OF CORRECTION

PATENT NO. : 4,160,276
DATED : July 3, 1979
INVENTOR(S) : Daniel George Baker

It is certified that error appears in the above-identified patent and that said Letters Patent are hereby corrected as shown below:

Column 3, Line 15 reads "chanted" should be --changed--.

Column 6, Line 10 reads "claim wherein" should be --claim 2 wherein--.

Signed and Sealed this

Second Day of October 1979

[SEAL]

Attest:

RUTH C. MASON
Attesting Officer

LUTRELLE F. PARKER
Acting Commissioner of Patents and Trademarks